Sept. 24, 1929.   H. R. LONTZ   1,729,002
GANG MOWER
Filed April 17, 1926   4 Sheets-Sheet 2

Inventor
Harry R. Lontz
By Mauro, Cameron, Lewis & Kerkam.
Attorneys

Sept. 24, 1929.  H. R. LONTZ  1,729,002
GANG MOWER
Filed April 17, 1926   4 Sheets-Sheet 3
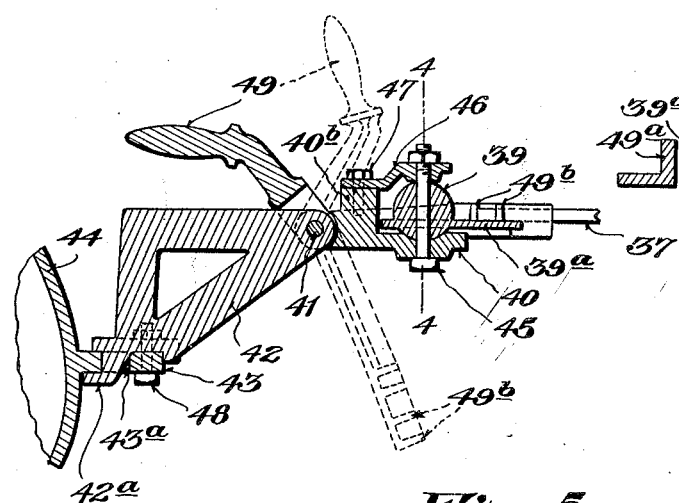
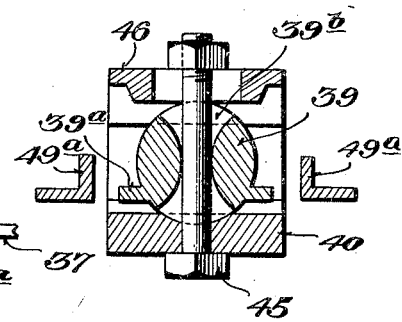
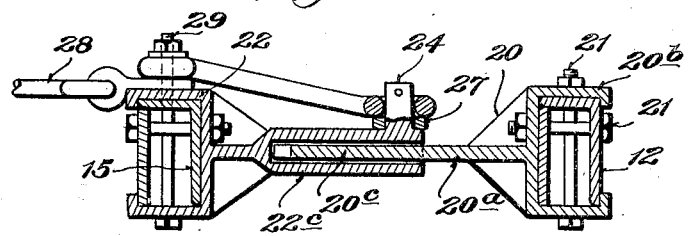
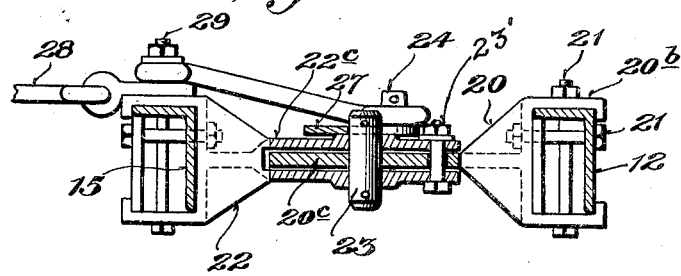
Inventor
Harry R. Lontz
By
Mauro, Cameron, Lewis & Kerkam
Attorneys Sept. 24, 1929.   H. R. LONTZ   1,729,002
GANG MOWER
Filed April 17, 1926   4 Sheets-Sheet 4
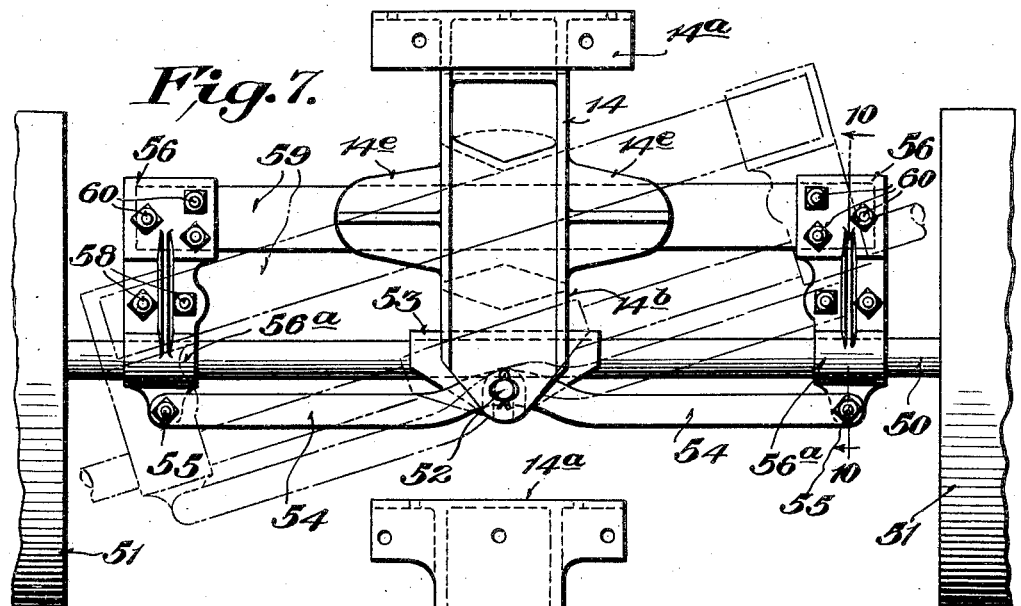
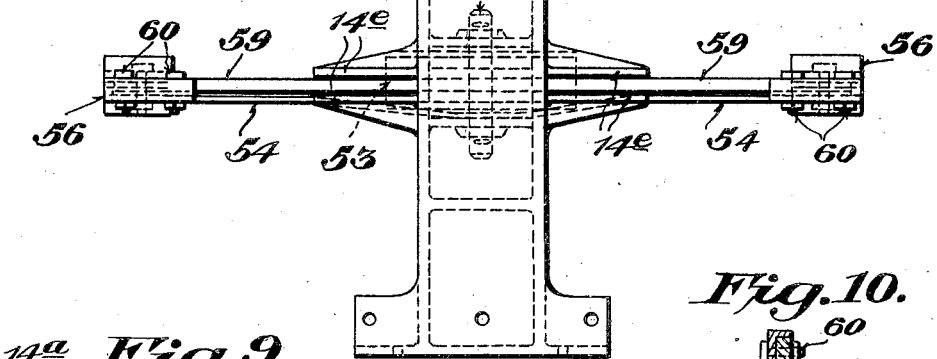
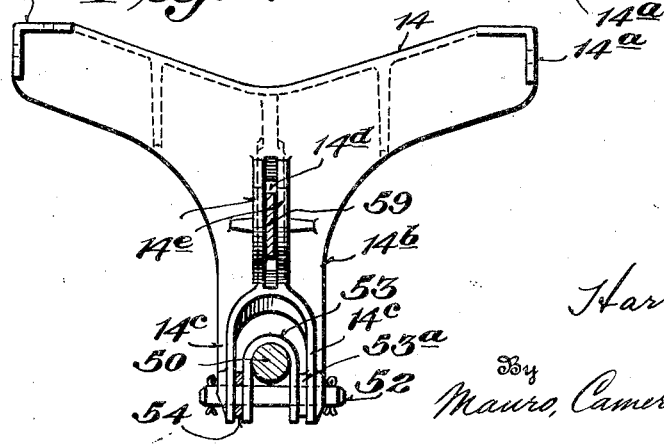
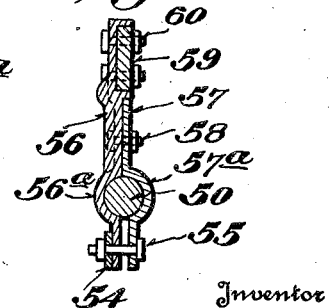
Inventor
Harry R. Lontz
By Mauro, Cameron, Lewis & Kerkam
Attorneys Patented Sept. 24, 1929

1,729,002

UNITED STATES PATENT OFFICE

HARRY R. LONTZ, OF RICHMOND, INDIANA, ASSIGNOR TO F. & N. LAWN MOWER COMPANY, OF RICHMOND, INDIANA, A CORPORATION OF INDIANA

GANG MOWER

Application filed April 17, 1926. Serial No. 102,770.

This invention relates to mowing machines, and more particularly to gang mowers.

It has heretofore been proposed to assemble mower units, of the rotating cutting-reel type, in gang formation, the gang mower being adapted to mow a continuous swath, and the individual units being adapted for limited, independent relative movement whereby said units accommodate themselves to the undulations of the ground. Ordinarily the mower units are arranged in a plurality of transverse rows and two, three or more units may be employed in a single row.

The articulate framework employed in gang mowers for obtaining independent movement of the mower units, renders it difficult to reverse the direction of travel of the gang mower. The joints of the gang frame are usually so disposed that the gang mower can only be propelled or drawn in the cutting direction and cannot readily be reversed or "backed" to avoid obstructions.

Gang mowers must cut a continuous swath and to this end a certain amount of transverse rigidity must be incorporated into the frames to insure that the mower units in the transverse rows will maintain an overlapping relation at all times. This requirement usually results in a structure which is difficult to turn, and one wherein the ground engaging wheels of the mower units and of the frame will dig up the turf when the gang mower is operated in an arcuate path of relatively short radius.

In gang mowers of the type heretofore provided, difficulty is encountered when operating over knolls or mounds if the slopes of the latter are not parallel to the direction of travel of the gang, resulting in uncut grass or damage to the turf.

An object of the present invention is to provide a gang mower embodying a novel articulate framework which is so constructed as to permit independent movement of the mower units and yet one which may be propelled in a direction reverse to the normal direction of travel.

Another object of this invention is to provide a gang mower which is so constructed that the individual mower units will maintain an overlapping relation and yet one which is so constructed that the same may be operated in an arcuate path of relatively short radius without scarring or digging up the turf.

Another object is to provide a novel mower embodying means whereby the turf will not be damaged and the grass will be properly cut when the same is operated over knolls or mounds having slopes which are not parallel to the direction of travel of the gang.

Another object is to provide novel means for connecting the gang to a tractor or other draft means.

A further object is to provide means for connecting the gang mower to draft means which includes apparatus permitting the gang mower to be propelled in a direction reverse to the normal direction of travel.

Another object is to provide a gang frame embodying means intermediate the transverse rows of mower units for permitting limited pivotal movement about a vertical axis of the front row of units relative to the rear row of mower units.

A further object is to provide a gang mower of the above type which includes means for properly alining the front and rear rows of mower units after completing a turn.

A still further object is to provide novel means for securing the mower units to the gang frame whereby each unit has independent movement relative to the frame to insure that the same will conform to undulating ground.

Referring to the accompanying drawings, illustrating one expression of the inventive idea, Figs. 1 and 1ª constitute a top plan view of an embodiment of the present invention, certain parts being broken away in order to employ drawings of large scale;

Fig. 3 is a detail sectional view illustrating one embodiment of mechanism which may be employed for connecting the gang frame to power means;

Fig. 4 is a section taken on the line 4, 4 of Fig. 3;

Figure 1:
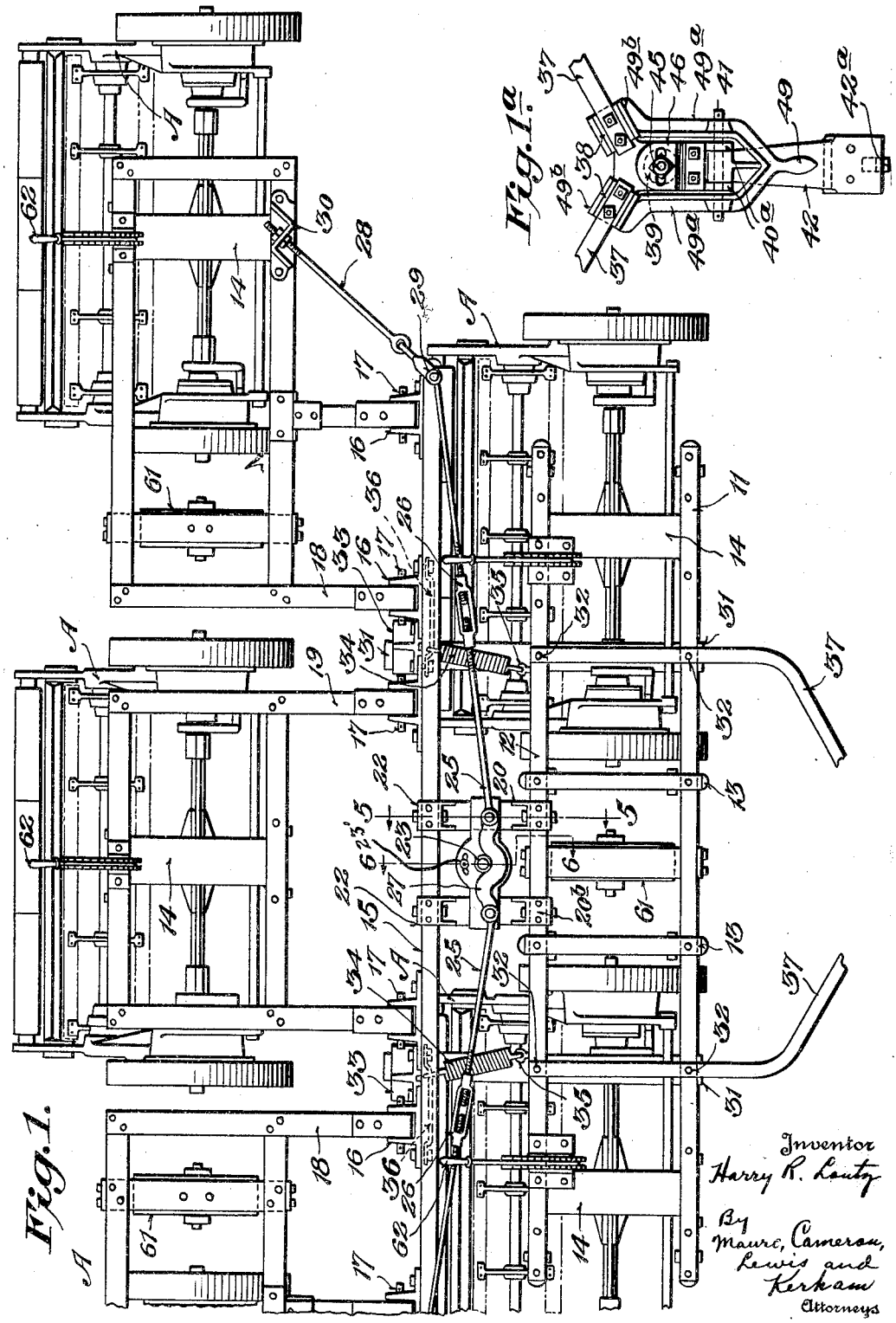

Figs. 5 and 6 are sectional views taken on the lines 5, 5 and 6, 6 respectively, of Fig. 1;

Fig. 7 is a side elevation of novel means which may be employed for connecting the mower units to the frame;

Fig. 8 is a top plan view of the connecting means shown in Fig. 7.;

Fig. 9 is an end view partly in section of the connecting mechanism shown in Fig. 8; and Fig. 10 is a section taken on the line 10, 10 of Fig. 7.

Referring to the drawings, wherein like reference characters refer to like parts throughout the several views, the gang lawn mower constituting the subject matter of the present invention is preferably of the trailing type and, in the form shown, embodies five mowing units A of any suitable type and size. Preferably these units are of the rotating cutting-reel type but the specific details of said units constitute no part of the present invention. As illustrated, units A are arranged in two transverse rows, the front row being constituted by two units and the rear row by three units. It is to be expressly understood, however, that the number of units employed and the arrangement of the same may be varied.

A novel articulate frame is provided for sustaining the draft of the mower units. As shown, said frame includes a portion for the front row of units which is constituted by a pair of transversely extending rails 11, 12 that may be formed of suitable angle irons (Figs. 5 and 6), and which are maintained in spaced relation by longitudinally disposed bars 13, 13 and draft brackets 14, 14 to be described more fully hereafter.

The rear frame portion may be constituted by a transversely disposed rail 15 provided on its rear face with a plurality of pairs of ears 16 to which are pivoted by horizontal, transversely disposed pins 17, a plurality of frame sections 18, 18, 19 for the mower units of the rear row, one section being provided for each unit.

Novel means are provided for connecting the front and rear frame portions, and preferably the connecting means are so constituted that the said portions may have relative pivotal movement about a vertical axis. In the form shown, the rail 12 is provided, at the central portion thereof, with a rearwardly extending and substantially U-shaped bracket 20, the arms 20ª (Fig. 5) of the latter having portions 20ᵇ which extend above and below the rail 12 and which are secured to said rail as by means of bolts 21. The rear transverse portion of bracket 20 constitutes a leaf 20ᶜ which extends between and is guided by the double-leaf portions 22ᶜ of a substantially U-shaped bracket 22 that is secured as by means of bolts, to the central portion of rail 15, and projects forwardly from the latter. The leaf portions of brackets 20 and 22 are pivotally connected by a vertically disposed king pin 23 (Fig. 6) which constitutes a connecting draft element between the front and rear frame portions. Suitable pin and slot means 23′ are preferably provided for said leaf portions to positively limit the relative pivotal movement of the same. If desired, the upper leaf portion 22ᶜ of bracket 22 may be provided with a pair of upwardly extending pins 24 for receiving a pair of diagonally disposed tension rods 25, which are adjustable as by means of turnbuckles 26, and which are secured at their rear ends to the opposite extremities of rail 15. A plate 27, having its central portion curving in front of and bearing against king pin 23, may be fitted at its opposite ends to the pins 24. Diagonally disposed tension rods 28 may be secured at their forward ends, as at 29, to the extremities of the rail 15 and at their rear ends to suitable brackets 30 that are rigidly attached at suitable points to the terminal sections 18 to insure against buckling of the latter when the gang mower is operated in an arcuate path.

Preferably a pair of longitudinally disposed guide bars 31 (Fig. 1) are secured at points 32 to the lower surface of rails 11 and 12, the rear ends of the bars 31 terminating a short distance in the rear of rail 15. A large bearing surface for the bars is provided at rail 15 by substantially L-shaped brackets 33 which are secured to the rear face of the latter. The bars 31 slidably engage and guide rail 15 in its pivotal movement about the vertical axis constituted by king pin 23, and resist any tendency of the rail to twist in a vertical plane.

Means are provided for yieldingly resisting pivotal movement of rail 15 about king pin 23 and for returning the front and rear rows to a substantially parallel position after the gang mower has been turned, or operated in an arcuate path. To this end a pair of equalizing springs 34 are secured, as by means of eye bolts 35, to the rear face of rail 12 on the opposite sides of bracket 20. The rear ends of the springs are slidably connected to the rail 15 by means of suitable brackets 36.

Novel means are provided for connecting the gang frame to power means such as a tractor, although it will be understood that the gang may be horse drawn if desired. For this purpose pulling-irons 37 are secured to the upper surface of rails 11 and 12. The rear ends of pulling-irons 37 are substantially parallel, while the front ends are bent inwardly and secured as by means of bolts 38 to the upper surface of an oscillating pull-head. In the form shown, this pull-head is constituted by a spherical member 39 (Figs. 3 and 4) which is preferably provided, at a point intermediate the center and the lower side thereof, with a flat plate-like portion 39ª, the pulling-irons 37 being directly attached to the rear end of the plate portion 39ª. Extending vertically through the spherical member 39 is a transverse slot 39ᵇ, the end walls of the slot being substantially hyperbolical in section, as is illustrated more clearly in Fig 4. The spherical member 39 rests in a cup or a depression formed in the upper surface of the rear end of a member 40 that is pivotally connected, as by means of a pair of ears 40ᵃ (Fig. 1ᵃ) and a horizontal and transversely disposed pin 41 to the rear end of a main draw casting 42. The latter is rigidly secured to the pulling-head 43 of a tractor 44 (shown in part only). Spherical member 39 is pivotally secured to member 40 as by means of a pin or bolt 45 which extends upwardly through the cup portion of member 40 and through the slot 39ᵇ in said spherical member. Preferably the upper end of pin 45 is secured by a bracket 46 and bolt 47, to an upwardly extending lug 40ᵇ formed on member 40. As shown, the main draw casting 42 is provided with a grooved toe 42ᵃ, the lower portion of which extends through an opening 43ᵃ in the pulling-head 43 and cooperates with bolts 48 to rigidly secure draw member 42 to the pulling-head. It will be seen that the pulling-irons 37 are adapted for pivotal movement about a vertical axis relative to the main draw casting 42 and also about a transverse horizontal axis. Moreover, the pulling-irons have limited pivotal movement about a horizontal and longitudinally disposed axis, due to the connection constituted by pin 45, the slot 39ᵇ in the spherical member, and the cup formed in the upper surface of member 40 for receiving said spherical member. The functioning of the gang mower is therefore not impaired when the draft means 44 is operated on a different level from the mower units.

Figure 2:
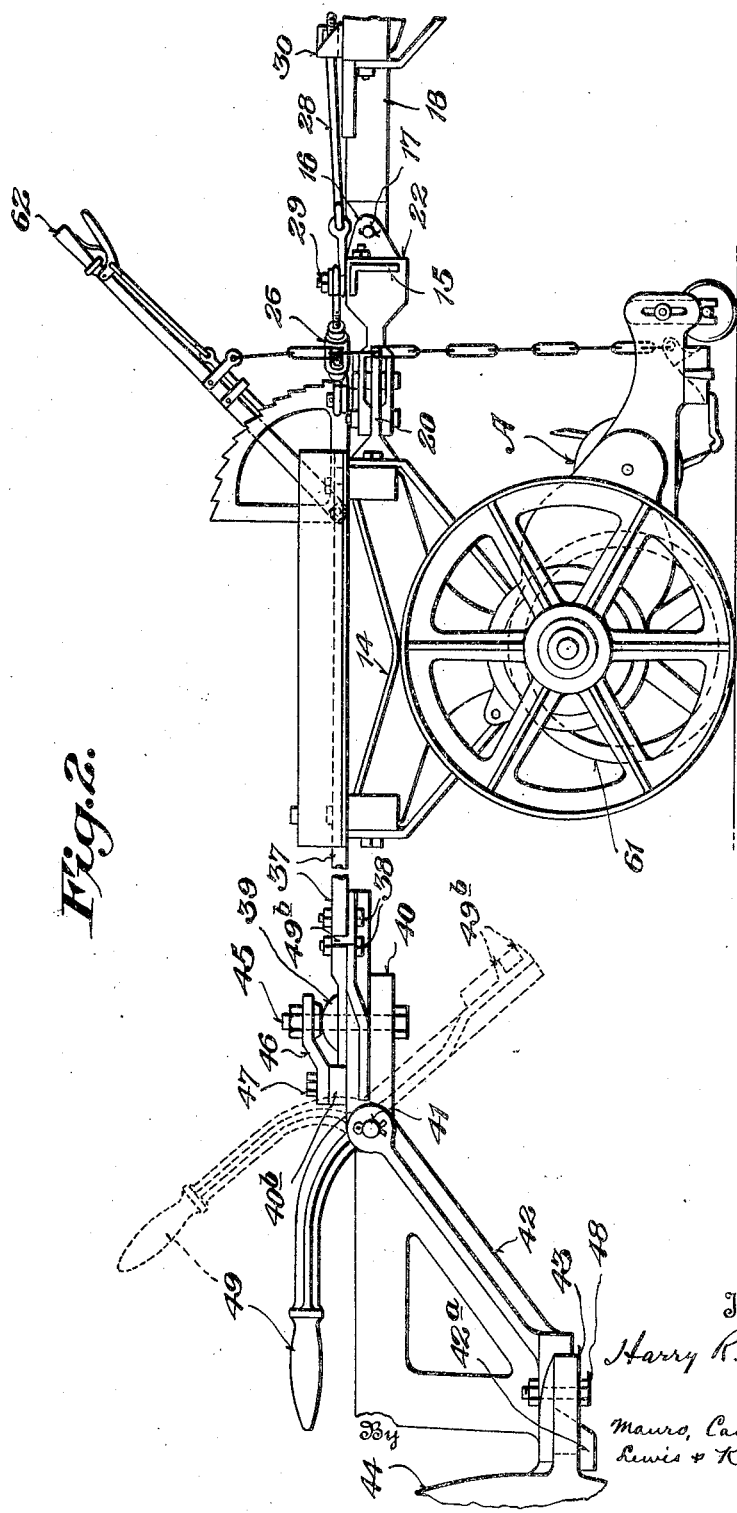
Fig. 2 is a side elevation of a portion of the mechanism illustrated in Figs. 1 and 1ª.

Novel locking means are provided to prevent pivotal movement of the pulling-irons 37 relative to the main draw casting or power means, when it is desired to reverse or back the gang mower. For this purpose there is employed a locking lever 49 (Fig 3) which is bifurcated to provide a pair of arms 49ᵃ (Fig. 1ᵃ) that are pivotally mounted on pin 41 on the opposite sides of ears 40ᵃ. The arms 49ᵃ extend rearwardly on the opposite sides of member 40 and are provided at their ends with a grooved portion constituted by a pair of upwardly extending and parallel flanges 49ᵇ. Normally the lever 49 occupies the dotted line position shown in Fig. 3 to permit free pivotal movement of the main draw casting relative to the pulling-irons 37. When it is desired to reverse the gang mower, the lever 49 is moved to the full line position indicated in Figs. 2 and 3, whereupon the grooved portions of the arms 49ᵃ engage pulling-irons 37 and lock the same against pivotal movement, and a rigid connection is provided between the tractor 44 and the gang frame. The lever 49 is so positioned that the driver need not leave his seat to operate the same.

Novel means are provided for independently securing each of the mower units to the articulate frame whereby each unit is permitted limited pivotal movement in a vertical plane and more limited movement in a horizontal plane. For this purpose a draft bracket 14 is provided for each mower unit. As shown more clearly in Figs. 7 to 10 inclusive, the draft bracket, which is preferably formed as a casting, is provided with an upper longitudinally extending portion 14ᵃ that is secured at its opposite ends to the rails 11 and 12 for the units of the front row, and to the elements of the frame sections 18, 18, 19 for the units of the rear row. Extending downwardly from the upper longitudinal portion 14ᵃ of the bracket is a portion 14ᵇ that is bifurcated at its lower end to provide a pair of arms 14ᶜ. The portion 14ᵇ of the bracket is provided at its central portion with a transverse opening 14ᵈ and extending laterally from the portion 14ᵇ on each side thereof, and on the opposite sides of the opening 14ᵈ, are pairs of ears 14ᵉ. The arms 14ᶜ extend on the opposite sides of the central portion of an axle 50 of the ground engaging wheels 51 of a mower unit A and are pivotally secured to said axle by means of a longitudinally disposed rocker pin 52, which extends through said arms below the axle 50 and also through the opposite ends of a U-shaped strap or saddle casting 53 which is carried by the axle 50. The rear side of the saddle casting is provided with an integrally formed pad 53ᵃ for spacing said casting from the adjacent arm 14ᶜ, while the front portion of casting 53 is spaced from the adjacent arm 14ᶜ by a transversely extending lower draw bar 54 that is pivotally mounted at the central portion thereof on the rocker pin 52.

As shown more clearly in Fig. 7, the lower draw bar 54, which is positioned below axle 50, is secured at its opposite ends as by means of bolts 55, to a pair of vertically disposed plates 56 and 57 that are clamped together as by means of bolts 58. Front plate 56 is provided adjacent the lower end thereof and immediately above the point at which it is connected to draw bar 54, with an arcuate portion 56ᵃ which surrounds one-half of the periphery of axle 50 and the rear plate 57 is provided with a similar arcuate portion 57ᵃ surrounding the rear half of axle 50, the bolts 55 and 58 serving to rigidly clamp said plates to the axle. An upper draw bar 59 is secured, as by means of bolts 60, to the upper ends of the plates 56 and the central portion of said draw bar extends through the opening 14ᵈ in the draft bracket.

Heretofore it has been common practice to associate the individual mower units with the gang frame in such a manner that said units are rigidly held normal, or at right angles, to the direction of travel of the gang, while free to oscillate in their vertical transverse planes about horizontal pivots. When it is desired to operate a gang mower of this type on a curved path of short radius the ground wheels of the mower units very frequently dig into and scar the turf. Preferably, the means employed in the present invention for independently securing the mower units to the articulate frame are so constituted that said mower units have limited movement in a horizontal plane whereby damage to the turf in making a turn of short radius is avoided. For this purpose the rocker pin 52 is loosely fitted into the ears 14ᵉ, of bracket 14, the saddle casting 53 and the lower draw bar 54. The laterally projecting ears 14ᵉ are so spaced apart that the upper draw bar 59 is permitted limited movement in a horizontal plane relative to said ears. The movement of the draw bar 59 relative to said ears is so limited, however, that the mower units are maintained at all times in overlapping relation when the gang is operated in a curvilinear path.

The draft bracket 14 and the upper and lower draw bars permit pivotal movement of the mower unit in a vertical plane with respect to its frame portion or section. The units of the front and rear rows have relative movement in a horizontal plane about the pin 23. The upper portion of the draft bracket constitutes a longitudinal strengthening member for the frame portion and sustains the draft of the mower unit through rocker pin 52, saddle casting 53, and the draw bars. A portion of the weight of the frame is carried by a suitable number of ground engaging wheels 61, three being employed in the embodiment of the invention illustrated. No portion of the weight of the frame is borne by the upper and lower draw bars 54 and 59. Suitable means including lift levers 62 are provided for raising the cutting-reels from the ground when not in use.

It will thus be seen that there is provided a gang mower embodying an articulate framework which is so constructed that the same may be operated over undulating ground, the mower units being maintained in overlapping relation whereby a continuous swath of grass is cut. Free pivotal movement is provided between the frame and the draft means or tractor, and means are provided for preventing this pivotal movement whereby the gang may be reversed.

When it is desired to operate the gang mower in an arcuate path, pivotal movement about vertical axes takes place at pins 23 and 45, whereby the gang mower may be turned in a relatively small space. The rear mower units have independent pivotal movement about pins 17 and may pivot in unison about king pin 23, thereby permitting said units to efficiently operate over knolls or mounds having slopes that are not parallel to the direction of travel of the gang. The equalizing springs 34 yieldingly resist but do not prevent pivotal movement of the front and rear frame portions and insure that rail 15 will be returned to a position substantially parallel to rails 11 and 12 after a turn has been completed. The individual mower units may tilt or oscillate in their transverse planes and have limited movement in their horizontal planes relative to the draft brackets 14. The transversely extending draw bars do not sustain any portion of the weight of the frame but are provided to coact with the longitudinally and horizontally extending rocker pin 52.

While only one embodiment of the inventive idea has been illustrated in the accompanying drawings, it is to be expressly understood that the invention is not limited thereto but that the inventive idea is susceptible of various mechanical expressions within the limits of the appended claims.

What is claimed is:

1. A gang mower comprising a plurality of mower units arranged in front and rear rows, a frame having transversely extending front and rear portions for sustaining the draft of said units, connecting means for said portions permitting pivotal movement in unison of the units of the rear row relative to the front row of units, said movement being restricted by said means to a single plane within predetermined limits regardless of the arc through which the gang mower is turned, means permitting independent movement of the units in vertical planes, and draft means secured to said front frame portion.

2. A gang mower comprising a plurality of mower units arranged in front and rear rows, a frame having front and rear portions for sustaining the draft of said units, means including a vertically disposed pivot member for connecting said frame portions, and means for limiting relative movement of the units about said pivot member.

3. A gang mower comprising a plurality of mower units arranged in front and rear rows, a frame having front and rear portions for sustaining the draft of said units, means including a vertically disposed pivot member for connecting said frame portions, and resilient means for resisting relative movement of the rear row of units about said pivot member.

4. A device of the class described comprising a plurality of mower units, frame means having front and rear portions for maintaining said units in gang formation, pivot means for connecting said frame portions, and means cooperating with the pivot means to prevent relative pivotal movement of the frame portions about a horizontal axis.

5. A device of the class described comprising a plurality of mower units, frame means having front and rear portions for maintaining said units in gang formation, pivot means for connecting said frame portions, means for positively limiting pivotal movement of the portions, and means for yieldingly resisting pivotal movement of the frame portions.

6. A device of the class described comprising a plurality of mower units, frame means having front and rear portions for maintaining said units in gang formation, pivot means for connecting said frame portions, means for positively limiting pivotal movement of the portions, resilient means for resisting pivotal movement of the frame portions, and means for preventing pivotal movement of the frame portions about a horizontal axis.

7. In a gang mower, a frame having front and rear portions, said rear portion including a transverse member, a plurality of frame sections having interleaving portions and means for pivotally connecting said sections to said member, and means including a vertically disposed pin for connecting said frame portions.

8. In a gang mower, a frame having front and rear portions, said rear portion including a transverse member, a plurality of frame sections and means for pivotally connecting said sections to said member, pivot means for connecting said frame portions, and resilient means secured to the transverse member for resisting pivotal movement of said portions.

9. In a gang mower, the combination with a plurality of mower units of the rotating cutting-reel type, of a frame having front and rear portions, said rear portion including a transverse rail and means for independently connecting a plurality of mower units to said rail, means for pivotally connecting said portions, means for limiting relative pivotal movement of said portions and draft means secured to said front portion.

10. A gang mower of the type adapted to be drawn comprising, in combination with a plurality of mower units, a frame having front and rear portions, means connecting said portions, means for connecting the front portion to draft means, said last-named means permitting universal movement of the front frame portion for limited pivotal movement relative to said draft means, and means for rendering said last named means inoperative.

11. A gang mower of the trailing type comprising, in combination with draft means, a plurality of mower units, a frame for said mower units, means for connecting said units to the frame for limited pivotal movement, means for pivotally connecting said frame to the draft means, and means for locking said frame against pivotal movement relative to said draft means.

12. A gang mower comprising, in combination with operating means, a plurality of mower units, a frame for said units, means connecting the units to the frame for limited pivotal movement, universal joint means for connecting the frame to the operating means, and manually operable means for locking said frame against pivotal movement relative to said operating means.

13. A gang mower of the trailing type comprising, in combination with draft means, a plurality of mower units, a frame having front and rear portions, means pivotally connecting said front and rear portions, means for limiting the pivotal movement of the frame portions, pivotal means for connecting said front portion to the draft means, and a lever for locking said front portion against pivotal movement relative to said draft means.

14. A gang mower comprising, in combination with a plurality of mower units, a frame, and draft means for the frame, said draft means including a spherical member rigidly attached to said frame, a main draw member, means pivotally connecting the spherical member to the draw member, and manually operable lever means for locking the frame against pivotal movement relative to the draw member.

15. A device of the class described comprising, in combination with a plurality of mower units of the rotating cutting-reel type, a frame, a spherical member rigidly attached to said frame, a draw member, a member pivoted to the draw member and having engagement with the spherical member, means for pivoting said last-named member to the spherical member, and means for preventing pivotal movement of the frame relative to the draw member.

16. A gang mower comprising in combination with a plurality of mower units of the rotating cutting-reel type, a frame, a spherical member having a slot therein rigidly secured to said frame, a main draw element, a member pivoted to said element for movement about a horizontal axis, and means secured to said last-named member and extending through the slot in the spherical member for permitting pivotal movement of the latter about a vertical axis.

17. A gang mower comprising, in combination with a plurality of mower units of the rotating cutting-reel type, a frame, a main draw element, universal joint means for connecting the frame to said element, and a lever pivotally secured to said element for locking the frame against pivotal movement relative to the main draw element.

18. A gang mower comprising, in combination with a plurality of mower units of the rotating cutting-reel type, a frame having front and rear portions, means pivotally connecting said portions, means for limiting pivotal movement of said portions, a main draw element, means for pivotally connecting said front frame portion to said draw element, and a lever mounted on the draw element for locking said front frame portion against pivotal movement relative to the draw element.

19. A gang lawn mower comprising, in combination with a plurality of mower units of the rotating cutting-reel type and having ground engaging wheels, a frame having a front and rear portion, said rear portion including a transverse member and a plurality of frame sections pivoted thereto, ground engaging means for a plurality of said sections, ground engaging means for the front frame portion, and means for connecting said portions permitting relative pivotal movement of the same about a vertical axis.

20. A gang lawn mower comprising, in combination with a plurality of mower units arranged in front and rear transverse rows, a frame operatively secured to said units, ground engaging wheels for supporting the frame, means permitting limited pivotal movement of the rear transverse row of mower units about the vertical axis relative to the front transverse row of units, a draft member for the frame, and means for connecting the draft member and frame permitting universal movement of the latter relative to the draft member.

21. A gang mower comprising a plurality of mower units arranged in front and rear transverse rows, a frame having front and rear portions secured to said units, means pivotally connecting said frame portions, resilient means having sliding engagement with the rear portion for yieldingly resisting said pivotal movement, and means for supporting a part of the weight of said frame portions.

22. A gang mower comprising a plurality of mower units arranged in front and rear transverse rows, a frame having front and rear portions secured to said units, means pivotally connecting said front and rear frame portions, and means pivotally connecting each of said units to the frame, said last-named means permitting limited pivotal movement of the units in vertical and horizontal planes.

23. In a gang mower, the combination with a frame of a plurality of mower units, and means for connecting a unit to said frame, said means including a member having a portion rigidly attached to the frame, means pivotally connecting said member to one of said units, and a draw bar extending through an opening in said member and rigidly connected to said unit.

24. In a gang mower, the combination with a frame and a mower unit having a pair of ground wheels and an axle connecting said wheels, of means for connecting said unit to said frame, said means including a member rigidly attached to the frame, and having portions extending on the opposite sides of said axle, means including a pivot member below the axle for securing said portions to the latter, and a pair of draw bars rigidly secured to said axle, one of said draw bars extending through said member and the other of said draw bars being pivotally secured to said pivot member.

25. In a gang mower, the combination with a frame and a mower unit having a pair of ground wheels mounted on an axle, a member rigidly secured to said frame and having portions extending on the opposite sides of said axle, a saddle carried by the axle, means for securing said portions to said saddle, and a draw bar extending through an opening in said member and rigidly attached to said axle.

26. In combination, a rigid draft member, a member adapted to be pulled by said draft member, universal joint means for operatively connecting said first and second named members, and manually operable means operatively connected to said joint means for rendering said universal joint means inoperative whereby movement of the draft member relative to the second named member is prevented.

27. A gang mower comprising, in combination with a frame having a plurality of portions and a mower unit having ground engaging wheels mounted on an axle, a draft bracket for securing said unit to a frame portion, means for pivotally securing said bracket to the central portion of the axle, and upper and lower draw bars rigidly secured to said axle, said pivot means permitting limited movement of said unit in both horizontal and vertical planes.

In testimony whereof I have signed this specification.

HARRY R. LONTZ.